United States Patent [19]

Masaki et al.

[11] Patent Number: 5,022,090
[45] Date of Patent: Jun. 4, 1991

[54] DIGITAL IMAGE PROCESSING APPARATUS FOR CORRECTLY ADDRESSING IMAGE MEMORY

[75] Inventors: Yasuo Masaki; Kimitoshi Hori, both of Osaka, Japan

[73] Assignee: Minolta Camera Kabushiki Kaisha, Osaka, Japan

[21] Appl. No.: 249,643

[22] Filed: Sep. 26, 1988

[30] Foreign Application Priority Data

Sep. 25, 1987 [JP] Japan ................................ 62-240258

[51] Int. Cl.$^5$ ............................................. G06K 9/00
[52] U.S. Cl. ....................................... 382/49; 382/50; 358/448
[58] Field of Search ............... 382/49, 41, 50; 365/76, 365/200 MS File, 900 MS File; 358/404, 429, 430, 443, 444, 448

[56] References Cited

U.S. PATENT DOCUMENTS

| | | | |
|---|---|---|---|
| 4,464,789 | 8/1984 | Sternberg | 382/49 |
| 4,574,394 | 3/1986 | Holsztynski et al. | 382/49 |
| 4,665,551 | 5/1987 | Sternberg et al. | 382/99 |
| 4,665,554 | 5/1987 | Sternberg | 382/49 |
| 4,860,375 | 8/1989 | McCubbrey et al. | 382/49 |

*Primary Examiner*—Michael Razavi
*Attorney, Agent, or Firm*—Burns, Doane, Swecker & Mathis

[57] ABSTRACT

Each of the processing circuits connected to an image data bus is adapted such that a delay of n transfer clocks (n is a positive integer) or an integer multiple thereof is generated between the input and output data. Therefore, the delay time of the whole processing circuit becomes an integer multiple of a fixed time period, no matter what pipeline structure is adopted to connect the processing circuits. An address counter connected to the image memory through an address bus delays one read address by a plurality of cascade connected delay circuits and outputs the same as write address with the output of respective delay circuit switched successively, so that it seemingly operates in the same manner as in the case where there are a number of write address counters.

7 Claims, 8 Drawing Sheets

DIGITAL IMAGE PROCESSING APPARATUS FOR CORRECTLY ADDRESSING IMAGE MEMORY

BACKGROUND OF THE INVENTION

1. Field of the Invention

The present invention relates to a digital image processing apparatus, and more specifically, to a digital image processing apparatus arithmetically processing original image data to enable image data converting processes such as a gradation correction, sharpening of image quality, and processes such as feature extraction from the original image data.

2. Description of the Prior Art

A digital image processing apparatus comprises an image input circuit for inputting image data, an image output circuit for outputting image data, an image memory for storing image data, processing circuit for arithmetically processing image data, a host CPU controlling these circuits and arithmetically processing image data by means of software, and so on. Generally, the host CPU is employed only for those arithmetic processes which can not be effected by the processing circuits. Basic processes are executed by hard logic of the processing circuits. Circuits other than the host CPU transfer image data to and from each other at high speed. However, a data bus is commonly provided which is exclusively used for transferring image data to and from each of the circuits, in consideration of the flexibility of the system.

In such digital image processing apparatus, a processing circuit is adapted to provide a plurality of functions by changing some settings therein, or a plurality of processing circuits are provided and the processing circuits are selected corresponding to the required functions, in order to accomplish these arithmetic functions. Now, a simple process can be effected by a single arithmetic function. However, a process in accordance with a complicated algorithm requires a plurality of different operations or repetition of one operation carried out successively. In order to do so, the processing circuits and processing functions in association with the process must be successively switched. This requires a long period of time. Therefore, the above described sequential processing can not cope with those cases where inputted images to be processed must be continuously processed (real time processing) and where a prescribed processing speed is necessary. In view of the foregoing, in order to increase the speed of operation, a number of necessary processing circuits are provided with input/output data of respective processing circuits coupled to each other in accordance with the order of processing to operate all the processing circuits simultaneously so as to enable simultaneous execution of all required arithmetic functions. This is generally called pipeline processing. In the pipeline processing, the data provided during processing may not be temporarily stored in the image memory, whereby the real time processing of the input data is made possible.

As described above, in order to execute complicated arithmetic processes on real time in a digital image processing apparatus, a number of processing circuits should be provided pipeline coupled with each other. There are two methods of pipeline-coupling of the plurality of processing circuit. Namely, (a) a method in which a plurality of processing circuits are coupled with each other in advance in accordance with a prescribed order, and (b) a method in which a plurality of processing circuits are adapted to be coupled with each other in an arbitrary order.

In the former method (a), unnecessary processing circuits out of the coupled processing circuits should be set in a processing state in which the input data is outputted as it is without any change made thereon, and only necessary circuits are set at prescribed operation state. If the desired order of processing can not be realized, the data provided during the process must be temporarily stored in the image memory.

In the latter method (b), any process can be continuously executed, since only the necessary processing circuits are combined arbitrarily. Therefore, as for the processing functions and processing speed, the latter method is superior to the former one. However, the latter method has disadvantages that the delay time of the whole processing circuit between the input and output data changes dependent on the combination, since the processing circuits are arbitrarily coupled with each other (the delay time may also change in the former method dependent on the processes). Therefore, when the data resulting from the process should be written in the image memory, the image memory for writing (the memory in which data from the image data bus are written: the memory from which the data are read to the image data bus will be hereinafter referred to as an image memory for reading), must use a write address which is delayed from the standard address by the time corresponding to the delay time generated in the processing circuit. When there are a plurality of image memories and each of the image memories operate independently to write image data with different delay times in parallel, a number of write address counters, the number corresponding to the number of image memories to which data should be written, becomes necessary. Namely, one write address counter must be provided for one image memory, which is quite uneconomical.

More detailed description will be given in the following with the reference to the figures.

Figure 1:
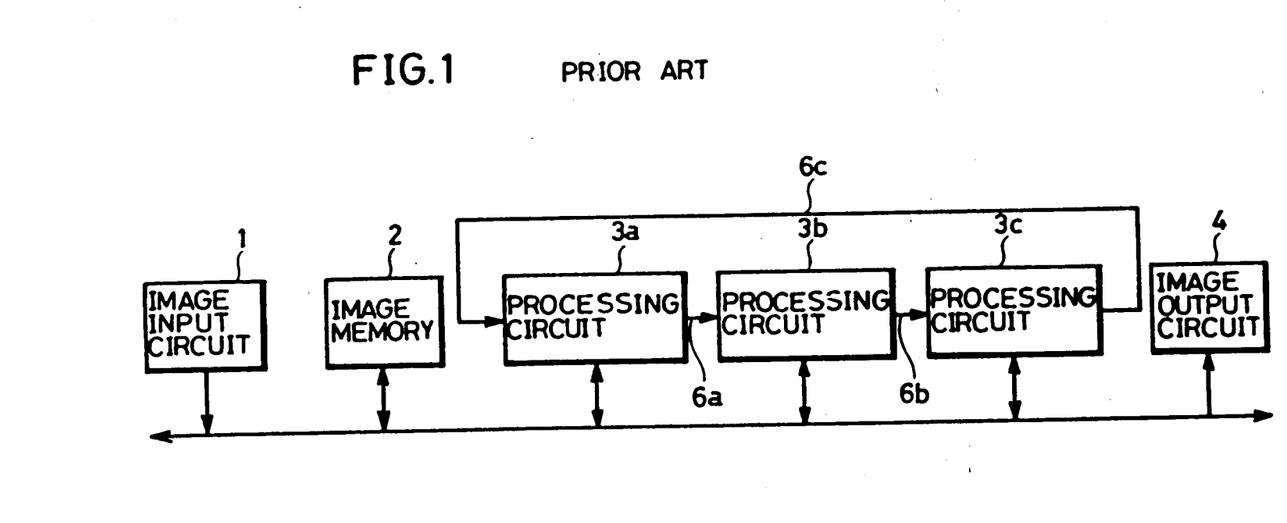
FIG. 1 is a block diagram showing one example of a conventional image processing apparatus comprising a plurality of processing circuits.

FIG. 1 shows an example of a structure of a digital image processing apparatus comprising a plurality of processing circuits which can be pipeline-coupled with each other, an image memory, an image input circuit and an image output circuit. The circuits are coupled by a data bus 5 exclusively used for image data. In order to simplify the description, the number of processing circuits is limited to three, and the host CPU which is necessary for control is omitted. As is shown in the figure, the image input circuit 1, the image memory 2, three processing circuits 3a, 3b and 3c and the image output circuit 4 are coupled with each other by the image data bus 5. The three processing circuits 3a, 3b and 3c are pipeline-coupled by signal lines 6a, 6b and 6c.

The image data are inputted from the image input circuit 1 through the image data bus 5 to the image memory 2. As for the output of the image data, the image data read from the image memory 2 enters the image output circuit 4 through the image data bus 5, and they are outputted from the circuit 4 to an external image display apparatus, image recording apparatus, and so on.

The image data is arithmetically processed in various states of operation. For example, in processing image data, only one of the three processing circuits 3a, 3b and 3c operates; two or more of the processing circuits operate in parallel but independently from each other;

two of the processing circuits operate pipeline-coupled with each other, and the remaining one does not operate; two of the circuits operate pipeline-coupled with each other, and the remaining one operates in parallel independently; three circuits operate pipeline-coupled with each other, and so on. Other states of operation including pipeline-coupling can be provided by changing combination and order of the processing circuits. In any case, the data read from the image memory 2 or the image data provided from the image input circuit 1 are inputted to the processing circuit (3a, 3b or 3c) as images to be processed through the image data bus 5, and the result of processing is applied to the image memory 2 or to the image output circuit 4 through the image data bus 5.

FIGS. 2 to 5 show connections between the image memory 2 and the processing circuits 3 in various states of arithmetic processing.

Figure 2:
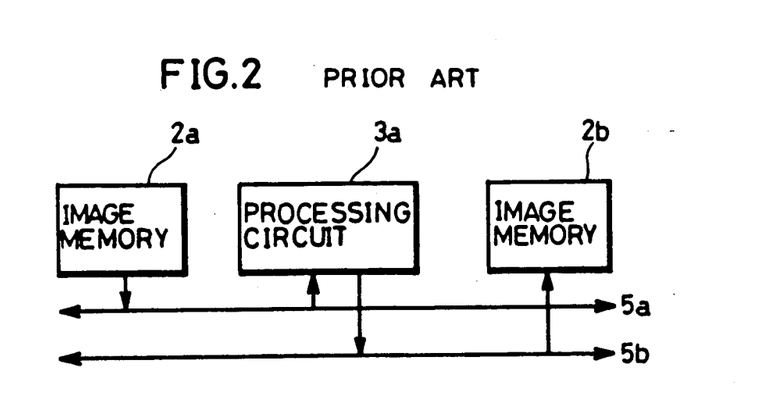
FIG. 2 to 5 illustrates various applications of the processing circuits of the conventional image processing apparatus.

In FIG. 2, only one processing circuit 3a out of three processing circuits 3a, 3b and 3c operates. The image to be processed is stored in the image memory 2a, and the read data from the image memory 2a is inputted to the processing circuit 3a through the image data bus 5a and processed in the processing circuit 3a, with the result of processing stored in the image memory 2b.

Figure 3:
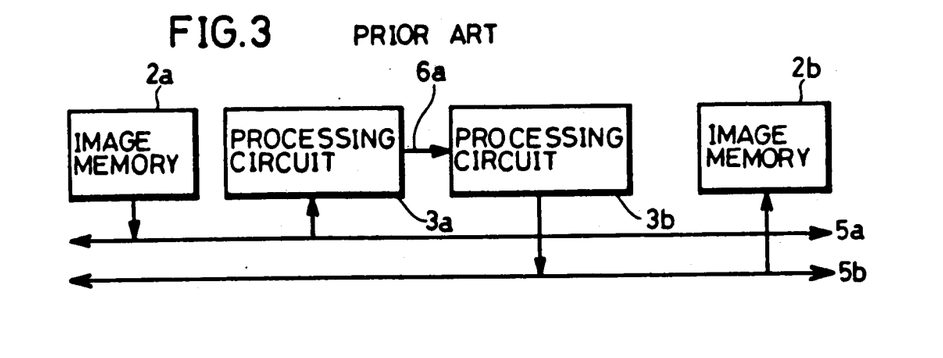

In FIG. 3, two processing circuits 3a and 3b of the three processing circuits 3a, 3b and 3c operate pipeline-coupled with each other. The image to be processed is stored in the image memory 2a, and it is processed in two processing circuits 3a and 3b, with the result stored in the image memory 2b. Although the processing circuits 3a and 3b are coupled in this example, the combination of the processing circuits 3b and 3c or 3c and 3a are also possible.

Figure 4:
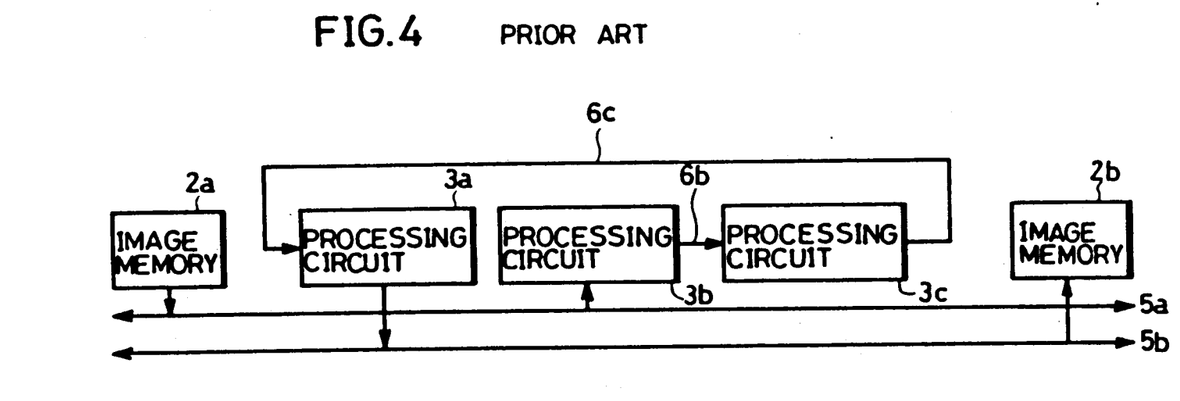

In FIG. 4, three processing circuits 3a, 3b and 3c operate pipeline-coupled with each other. In this case also, the image to be processed is stored in the image memory 2a, and it is processed in three processing circuits 3b, 3c and 3a with the result stored in the image memory 2b. The circuits may be coupled in accordance with the order of 3c, 3a and 3b or 3a, 3b and 3c, other than the shown order 3b, 3c and 3a.

Figure 5:
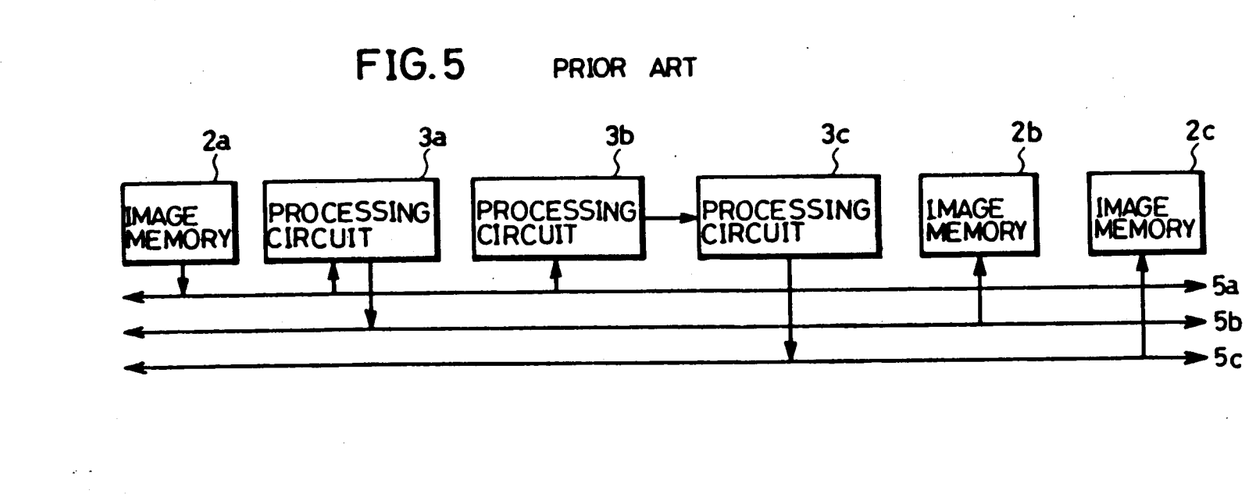

In FIG. 5, two processing circuits 3b and 3c of the three processing circuits 3a, 3b and 3c operate pipeline coupled with each other and the remaining processing circuit 3a operates independently. The read data from the image memory 2a are commonly inputted to the processing circuits 3a and 3b to be differently processed, with the results being written in the image memories 2b and 2c, respectively.

As described above, when there are a plurality of processing circuits 3a, 3b and 3c and various combinations of pipeline-coupling are possible between the circuits, the flow of the image data varies widely dependent on the combination of the pipeline-coupling, presence/absence of parallel operation, and selection of the image memory 2 for input and output.

In the foregoing, the delay of data generated in the processing circuits 3a, 3b and 3c is not considered. Generally, when an image to be processed passes through a processing circuit, there will be some delay between the input and output data. The image data is handled in synchronization with a transfer clock of a prescribed period on the image data bus or in each of the processing circuits. The delay mentioned above is represented by the unit of the transfer clock. For example, referring to FIGS. 1 to 5, it is assumed that three processing circuits 3a, 3b and 3c respectively generate delays of l, m, n clocks between the input and output of the image data. In the structure of FIG. 2, there is a delay of l clocks between the read data of the image memory 2a and the write data of the image memory 2b. Similarly, in the structure of FIG. 3, there is a delay of (l+m) clocks, and in the structure of FIG. 4, there is a delay of (l+m+n) clocks. In the structure of FIG. 5, there is a delay of l clocks in the write data of the image memory 2b and there is a delay of (m+n) clocks in the write data of the image memory 2c, respectively.

As described above, only by changing the pipeline structure in the processing circuits or only by changing the processing circuit to be used, the number of stages of delay between input/output data to and from the processing circuit varies widely. Table 1 shows the relation between the combination of the processing circuits employed and the number of delay stages.

TABLE 1

| PROCESSING CIRCUITS EMPLOYED | NUMBER OF DELAY STAGES |
|---|---|
| 3a | l |
| 3b | m |
| 3c | n |
| 3a, 3b | l + m |
| 3b, 3c | m + n |
| 3c, 3a | n + l |
| 3a, 3b, 3c | l + m + n |

Now, the problem exists in the fact that the write address to be applied to the image memory for writing (the memory in which data are written from the image data bus 5) must correspond the number of delay stages which changes dependent on the structure of the processing circuits 3. When the image memory 2 in operation comprises one memory for reading and one memory for writing as in the structures shown in FIGS. 2 to 4, only one read address counter for generating read address and one write address counter generating write address should be provided. In this case, to change the value of the write address in correspondence with the value of the read address in accordance with the number of delay stages generated by he processing circuits 3 is not a serious problem. However, if there are two sets of processing circuits operating in parallel and the number of delay stages incidental thereto are different from each other as in the structure of FIG. 5, different write addresses corresponding to respective write data must be provided for the image memories 2b and 2c for writing. In this case, two sets of write address counters should be independently provided. If a larger number of write addresses are necessary, the number of write address counters should also be increased. In a system in which address counter is separately provided external to the image memory, a number of write address counters must be needed with the number corresponding to the number of image memories which can be simultaneously set in the write operation state. Furthermore, the operations of the write address counters are not uniform, causing increase of the size of the hardware and making the control troublesome. Meanwhile, if an independent address counter is appended to every image memory, the trouble of selecting the write address to be employed can be eliminated. However, the setting of the operation state of the write address counter is required, and the hardware becomes larger.

Meanwhile, a method is proposed to compensate for the delay time, in which a circuit capable of making constant the delay time is interposed in the final stage of the pipeline-coupling of the processing circuits. However, in the case where all of the processing circuits operate in parallel, the number of such delay time compensating circuits must be the same as that of the processing circuits, increasing the cost. Furthermore, according to this method, a prescribed delay time must be generated even when the read data of the image memory is directly written in another image memory.

SUMMARY OF THE INVENTION

The present invention was made to solve the above described problem in relation to the difference of delay time derived from various couplings between processing circuits in an image processing apparatus having a plurality of processing circuits capable of pipeline processing of image data, and its object is to provide a digital image processing apparatus capable of correctly addressing image memory by a simple structure without requiring a delay time compensating circuit in its processing circuit or a write address counter in its image memory.

Brief stated, the present invention comprises an image input circuit for inputting image data, an image output circuit for outputting image data, a plurality of image memories for storing image data, a plurality of processing circuits capable of pipeline processing image data, an image data bus for transferring image data between each of the circuits in accordance with a transfer clock, an address counter generating a read address and a write address to be applied to the image memory, and an address bus for applying the address generated by the address counter to the image memory. Each processing circuit is structured such that a delay of n (n is a positive integer) transfer clocks or an integer multiple of n clocks is generated between the input and output data. The address counter comprises a read address counter which is counted up in a period of n transfer clocks and a delay circuit array in which multiple stages of delay circuits generating delay of n transfer clocks are cascade connected to generate a plurality of write addresses from a read address inputted to the delay circuit of the first stage. The image memory comprises a write address selecting circuit which selects, when the delay time of the write data is Kxn (K is a positive integer) transfer clocks, a write address outputted from the Kth delay circuit.

According to the present invention, the delay time generated in each processing circuit is limited to be n transfer clocks or an integer multiple thereof. Therefore, the delay time of the whole processing circuit becomes the integer multiple of n transfer clocks regardless of the combination of the plurality of processing circuits, whereby the processing circuits can be freely coupled with each other. Since a delay circuit array which delays the output of the read address counter successively by n transfer clocks is used to provide a plurality of write addresses, the address generating mechanism can be simplified, as one address counter seemingly operates in the same manner as in the case where there are a plurality of write address counters. In addition, since the address generating mechanism is out of the image memory, the image memory have only to select the necessary address, and therefore, the circuit scale of the image memory does not become larger.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described in the following.

(i) The whole structure

Figure 6:
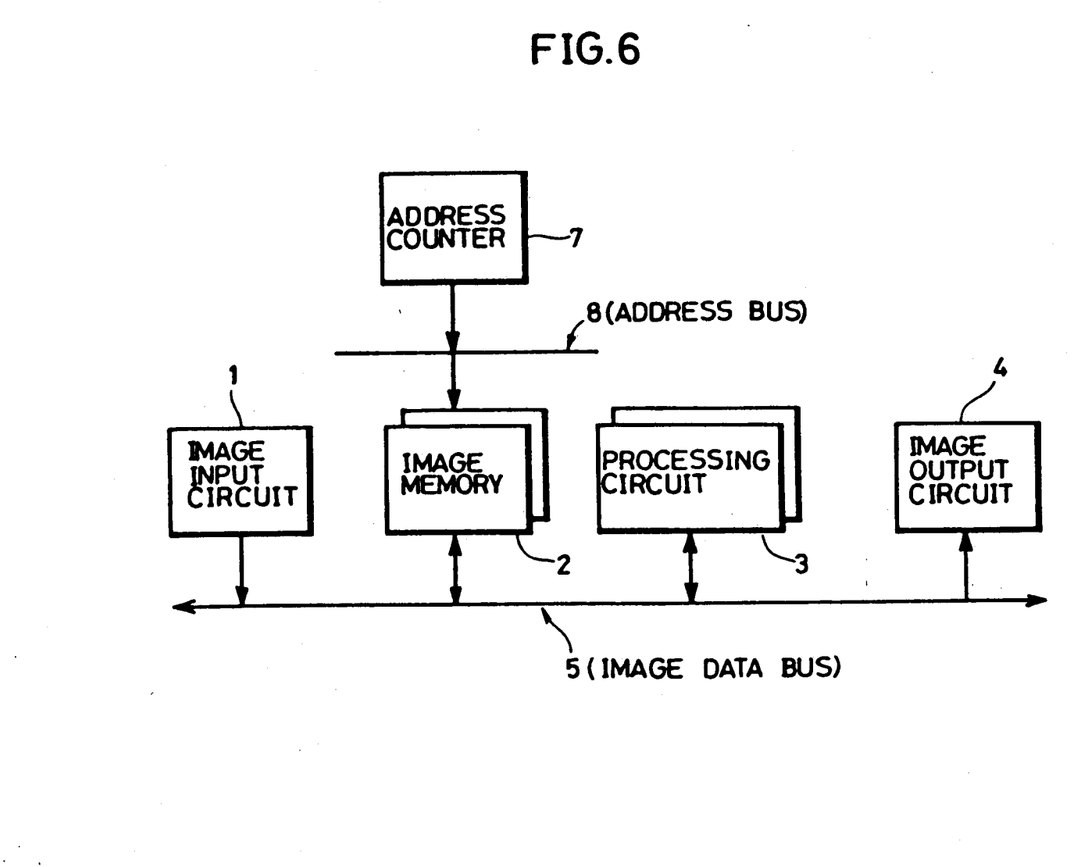
FIG. 6 is a block diagram showing the structure of the image processing apparatus in accordance with one embodiment of the present invention.

FIG. 6 is a block diagram showing the structures of the digital image processing apparatus in accordance with one embodiment of the present invention. As is shown in the figure, this embodiment comprises an image input circuit 1, an image memory 2, a processing circuit 3, an image output circuit 4, and an image data bus 5. The processing circuit 3 comprises a plurality of processing circuits and is capable of being variously pipeline-coupled. The number of delay stages between the input and output data of each processing circuit 3 is limited to an integer multiple of a basic number of delay stages (8 clocks in this embodiment). This embodiment also comprises an address counter 7. The address counter 7 transmits generated read address and write address to an address bus 8. The image memory 2 receives the read address and the write address from the address bus 8 and carries out reading operation or writing operation at desired timing.

(ii) Structure of the address counter 7

Figure 7:
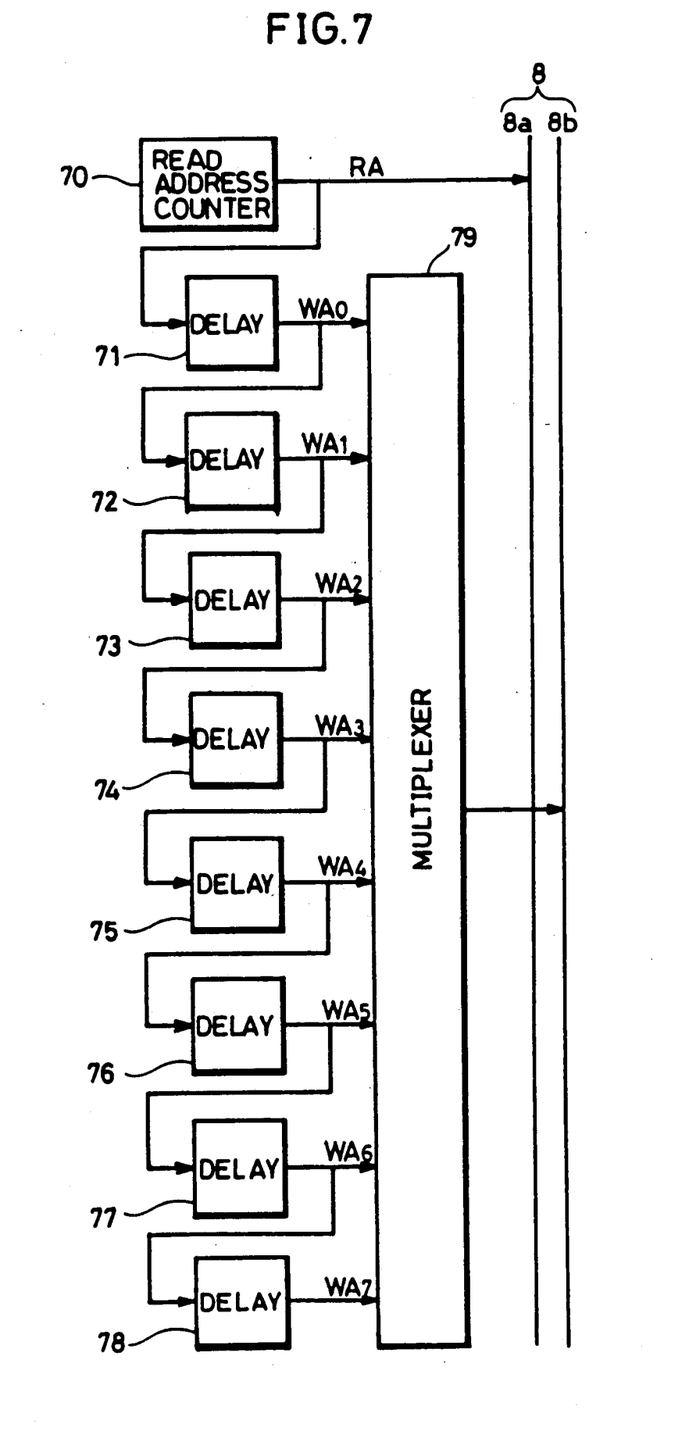
FIG. 7 is a block diagram showing an example of the structure of the address counter 7 shown in FIG. 6.

FIG. 7 is a block diagram showing an example of the internal structure of the address counter 7 in the embodiment of FIG. 6. Referring to the figure, the address counter 7 comprises a read address counter 70, delay circuits 71 to 78 and a multiplexer 79. The counter 70 outputs a read address RA to an address bus 8a. The delay circuit 71 is necessary to obtain a basic write address WA0 to be applied to an image memory 2b for writing from the read address RA when the read data of an image memory 2a should be directly written to another image memory 2b, that is, when there is no delay of data. The delay circuits 72 to 78 generate delays of the same number of delay stages as the basic delay stage number of the processing circuit 3. The multiplexer 79 time-division-multiplies the write addresses WA0 to WA7 outputted from respective delay circuits 71 to 78 to output the result to one address bus 8b. In the example of FIG. 7, there are 8 delay circuits 71 to 78 to provide 8 write addresses WA0 to WA7 simultaneously. However, the number of the delay circuits 71 to 78 is not limited to 8.

(iii) Structure of the image memory 2

Figure 8:
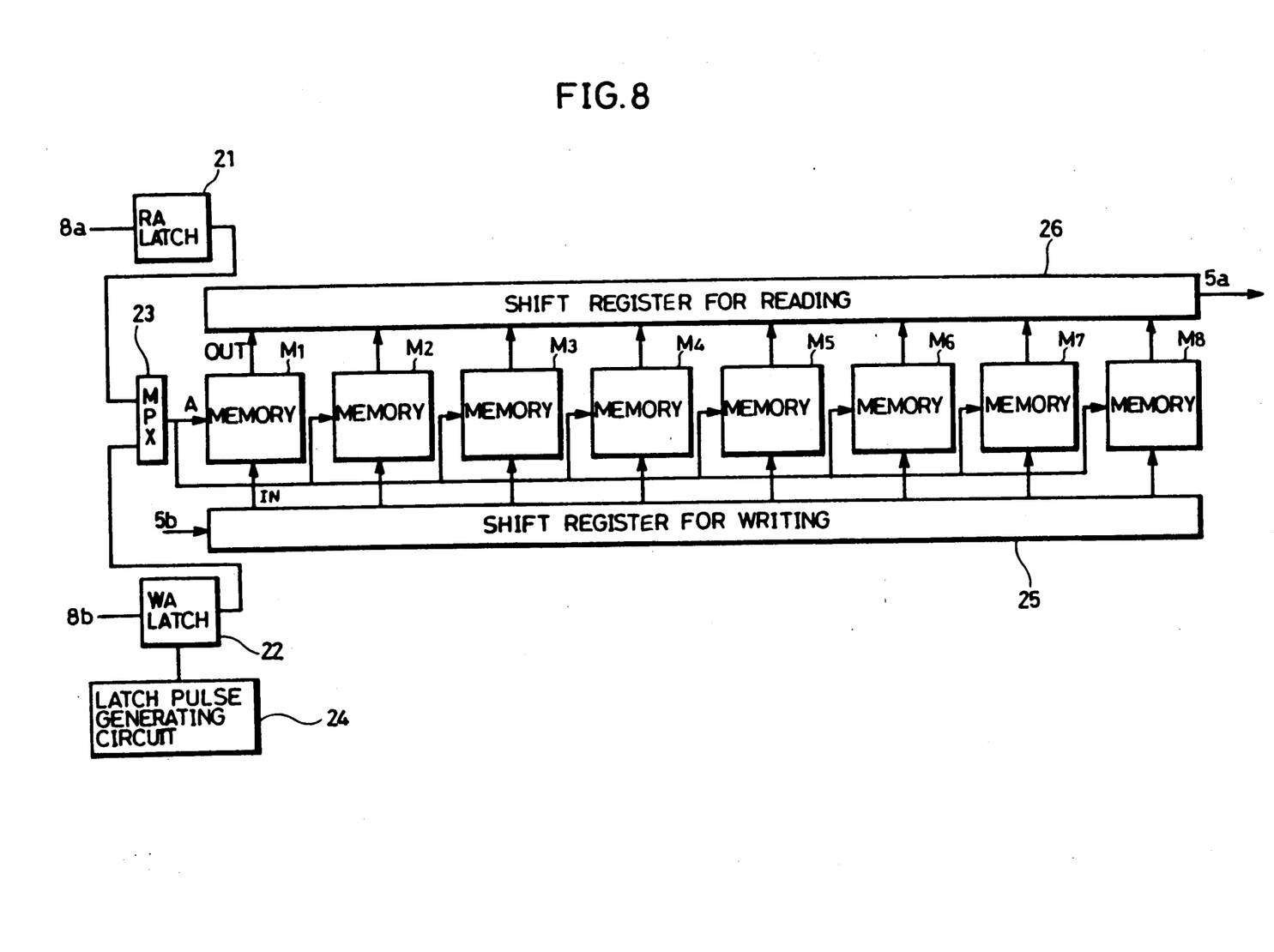
FIG. 8 is a block diagram showing one example of the structure of the image memory 2 shown in FIG. 6.

FIG. 8 is a block diagram showing an example of the structure of the image memory 2 adapted for the read address RA and the write addresses WA0 to WA7 outputted from the address counter 7 shown in FIG. 7. Referring to the figure, the image memory comprises 8 sets of memory devices M1 to M8 with each of the memory devices M1 to M8 having an address input terminal A, a data input terminal IN and a data output terminal OUT. The image memory comprises a read address latch 21 for latching the read address RA on the address bus 8a at a certain time in the former half of the 8 clock period; a write address latch 22 for latching a necessary one of 8 write addresses WA0 to WA7 on the address bus 8b which is time-division multiplexed in the 8 clock period; an address multiplexer 23 for applying the write address WAi (i=0~7) in the former half of the 8 clock period and for applying the read address RA in the later half of the clock period to the address input terminals A of 8 sets of memory devices M1 to M8; and a write address latch pulse generating circuit 24 for applying a latch pulse to latch the necessary one write address WAi out of the 8 write addresses WA0 to WA7 in the 8 clock period to the write address latch 22. The image memory further comprises a shift register 25 which serial-parallel converts the data serially inputted from the image data bus 5b in accordance with the transfer clock to apply 8 data to the data input terminals IN of the 8 memory devices M1 to M8 in parallel in the 8 clock period; and a shift register 26 for reading which parallel-serial converts 8 data simultaneously read from the data output terminals OUT of the 8 memory devices M1 to M8 in 8 clock period to output the same as the serial data of transfer clock period to the image data bus 5a. The 8 data which are read and written simultaneously may be the data of adjacent 8 pixels or 8 bit data constituting 1 pixel.

(iv) Operation timing

Figure 9:
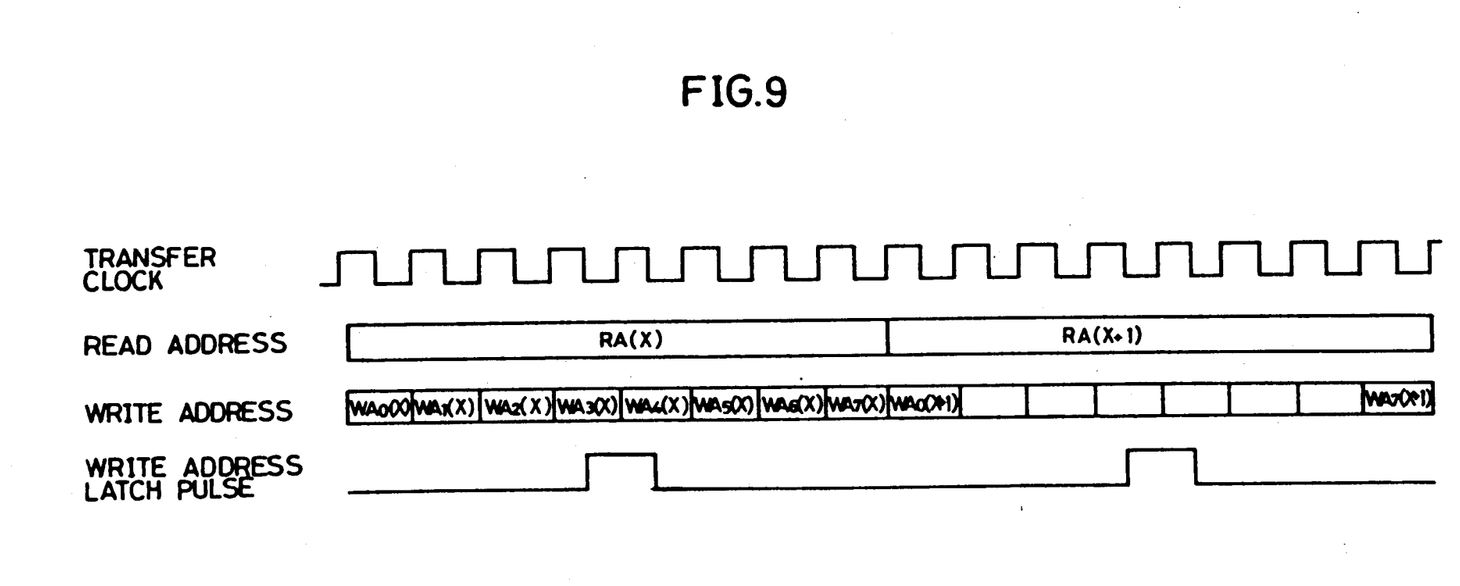
FIG. 9 is a timing chart illustrating the operation of one example of the present invention.

FIG. 9 shows a relation between the transfer clock and the read address and write address outputted from the address counter 7. In the figure the reference characters RA(x), RA(x+1) represent the read address outputted from the read address counter 70. Since the image memory 2 is accessed by 8 data unit as described above, the read address RA (x) is counted up by 8 clock period. Therefore, when the access cycle is x, there is the following relation between the neighboring read addresses, that is;

$$RA(x+1) = RA(x) + 1$$

The image memory on reading operation latches the read address at a time in a former half of the 8 clock period in the read address latch 21, and it applies the latched read address to each of the memory devices M1 to M8 on reading operation in the later half of the 8 clock period, in association with the switching of the address multiplexer 23. The read data from each of the memory devices M1 to M8 are loaded in the shift register 26 for reading at the end of the 8 clock period and thereafter, the data are serially read one by one to the image data bus 5a in accordance with the next 8 clock transfer clocks.

In FIG. 9, WA0(x)~WA7(x) represent write addresses outputted from delay circuits 71 to 78 in the address counter 7. A time period of 1 clock is allotted to every write address WAi(x) in the 8 clock period for the write addresses WA0(x)~WA7(x) whereby they are time-division multiplexed on the same address bus 8b by the address multiplexer 79. There is the following relation between the write addresses WA0(x) to WA7(x) and the read address RA(x).

$$WA0(x) = RA(x) - 1$$

$$WA1(x) = WA0(x) - 1$$

$$WA2(x) = WA1(x) - 1$$

$$WA7(x) = WA6(x) - 1$$

The write addresses WA0(x) to WA7(x) are applied to the image memory 2 by 8 clock period as in the case of the read address RA, and they are utilized to write 8 data simultaneously. Therefore, the address difference 1 between respective write addresses corresponds to 8 clock of the number of delay stages. In order to obtain a necessary write address from the write address bus 8b, the image memory 2 on writing operation generates a latch pulse of a desired timing in the write address latch pulse generating circuit 24, and latches the write address in the write address latch 22. In the example of the write address latch pulse shown in FIG. 9, the write address WA3(x) is latched to be used at the rising edge of the latch pulse.

The write data is serially inputted to the shift register 25 for writing, and 8 data are provided by 8 clock period. In the image memory 2, the write addresses provided in the write address latch 21 are switched by the address multiplexer 23 and they are applied to the memory devices M1 to M8 in the former half of the next 8 clock period. The said write data are applied to respective memory devices M1 to M8 to be written therein at the first clock of the next 8 clock period.

In this embodiment, the basic number of delay stages of the processing circuit 3 is selected to be 8 clocks, in correspondence with the 8 clock period to which the operations of the address counter 7 and the image memory 2 are subjected. More specifically, the number of delay stages generated in the arithmetic processing when a single processing circuit 3 operates or when a plurality of processing circuits 3 operate pipeline-coupled with each other will be the multiple of 8 clocks without fail. For example, let us assume that the number of delay stages generated in three processing circuits 3a, 3b and 3c of FIG. 1 are 8 clocks, 16 clocks and 24 clocks, respectively. In that case, the number of delay stages shown in Table 1 will be the multiple of 8 clocks in all cases as shown in Table 2. Table 2 shows write addresses which should be received by the image memory 2 in which the output data from the processing circuit 3 are written, as well as the number of delay stages. When a read data of an image memory 2a should be directly written in another image memory 2b without using a processing circuit 3, the image memory 2b for writing should utilize that write address WA0 as described above.

As described above, according to this embodiment, the writing operation of correct timing can be carried out only by selecting a desired one from a plurality of write addresses WA0 to WA7 which have been transmitted on the address bus 8b in advance, even when the number of delay stages of the write data to the image memory 2 changes in association with the pipeline structure of the processing circuit 3.

TABLE 2

| PROCESSING CIRCUITS EMPLOYED | NUMBER OF DELAY STAGES | WRITE ADDRESS |
|---|---|---|
| 3a | 8 | WA1 |
| 3b | 16 | WA2 |
| 3c | 24 | WA3 |
| 3a,3b | 24 | WA3 |
| 3b,3c | 40 | WA5 |
| 3c,3a | 32 | WA4 |
| 3a,3b,3c | 48 | WA6 |

TABLE 3

| PROCESSING CIRCUITS EMPLOYED | NUMBER OF DELAY STAGES GENERATED BY PROCESSING CIRCUITS | NUMBER OF DELAY STAGES TO BE SET IN FIFO REGISTER |
|---|---|---|
| 3a | 8 | 48 |
| 3b | 16 | 40 |
| 3c | 24 | 32 |
| 3a,3b | 24 | 32 |
| 3b,3c | 40 | 16 |
| 3c,3a | 32 | 24 |
| 3a,3b,3c | 48 | 8 |

(v) Structure of the image output circuit 4

Figure 10:
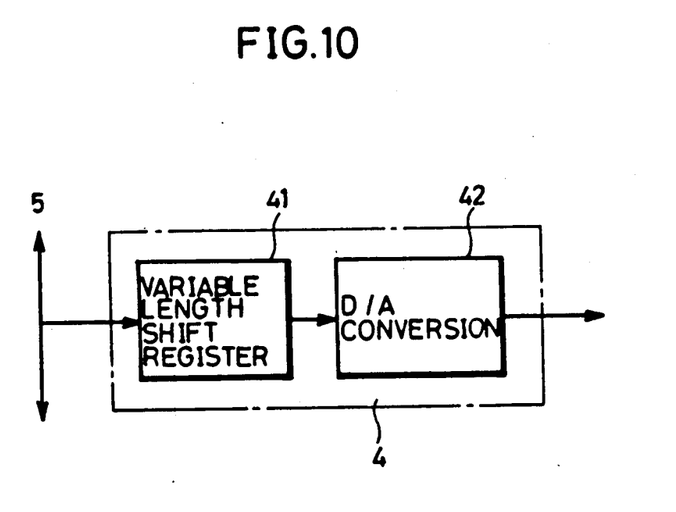
FIG. 10 is a block diagram showing an example of the structure of the image output circuit 4 shown in FIG. 6.

FIG. 10 is a block diagram showing an example of the structure of the image output circuit 4 shown in FIG. 6. In this example, an image output circuit is proposed which D/A converts the image data outputted from the image input circuit 1, the image memory 2, and the processing circuit 3 to the image data bus 5 to output the same as the analog video signal to be displayed on a video monitor and the like. In the figure, a variable length FIFO (First-In First-Out) register 41 obtains image data on the image data bus 5 and outputs the input data with a delay in accordance with a set number of delay stages. The D/A converting circuit 42 converts the output data from the FIFO register 41 to analog video signals. The number of delay stages of the variable length FIFO register 41 is selected such that the sum of the said number and the number of delay stages incidental to the inputted image data is constant. By doing so, the input timing of the display data applied to the D/A converting circuit 42 becomes constant, whereby the movement of the display image on the screen in left and right directions caused by the change of combination of the processing circuits 3 can be eliminated.

In this embodiment, there are 8 write addresses WA0 to WA7, and respective write addresses correspond to the image data having no delay, the image data having a delay of 8 clocks, the image data having a delay of 16 clocks, and the image data having a delay of 56 clocks, respectively. Therefore, the image data having 56 clocks of delay stages at the most can be written in the image memory 2 at correct timing. Since the number of delay stages do not exceed 56 clocks in the normal operation, the sum of the number of delay stages of the variable length FIFO register 41 and the number of delay stages incidental to the input image data should be no less than 56 clocks. When the value is 56 clocks, for example, the relation between the number of delay stages generated by the processing circuits 3 combined variously with the output of the processing circuit 3 outputted to the image output circuit 4 and the number of delay stages of the variable length FIFO register 41, will be as shown in Table 3. Therefore, a multiple of 8 no more than 56 may be used as the number of delay stages of the variable length FIFO register 41. Therefore, the change of delay stages generated by the processing circuit 3 can be easily compensated for even in the case of image output (display) as in the selection of the write address in the image memory 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital image processing apparatus comprising:
   an image input circuit for inputting image data;
   an image output circuit for outputting image data;
   a plurality of image memories for storing image data;
   a plurality of processing circuits capable of pipeline processing image data;
   an image data bus for transferring image data between each of said circuits in accordance with a transfer clock;
   an address counter generating a read address and a write address to be applied to said image memory; and
   an address bus for applying the address generated by said address counter to said image memory;
   wherein each of said processing circuits is structured such that a delay of n (n is a positive integer) transfer clocks or an integer multiple of n clocks is generated between the input and output data;
   said address counter comprises
   a read address counter which is counted up at a period of n transfer clocks, and
   a delay circuit array having multi stages of delay circuits, each generating a delay of n transfer clocks, cascade connected to generate a plurality of write addresses from a read address inputted to said delay circuit of a first stage; and
   said image memory comprises a write address selecting circuit which selects, when a delay time of a write data is K×n transfer clocks (K is a positive integer), a write address outputted from Kth one of said delay circuits; whereby the delay time of the whole processing circuit becomes the integer multiple of n transfer clocks regardless of the combination of the plurality of processing circuits and that the processing circuits can be freely coupled with each other.

2. A digital image processing apparatus according to claim 1, wherein
   said image memory comprises
   a shift register for writing converting n serial data on said image data bus to parallel data,
   n sets of memory devices in which parallel data outputted from said shift register for writing are simultaneously written, and
   a shift register for reading converting parallel data simultaneously read from said n sets of memory devices to n serial data to output the same on said image data bus.

3. A digital image processing apparatus according to claim 1, wherein a plurality of write addresses outputted from said delay circuit array are switched in synchronization with the transfer clock in a period of n transfer clocks to be time-division multiplexed on one write address bus.

4. A digital image processing apparatus according to claim 1, wherein said image output circuit comprises a variable length FIFO register provided at the input stage to maintain a number of delay stages of the output data at a constant value.

5. A digital image processing apparatus comprising:
an image input circuit for inputting image data;
an image output circuit for outputting image data;
a plurality of image memories for storing image data;
a processing circuit for processing image data;
an image data bus for transferring image data between each of said circuits in accordance with a transfer clock;
an address counter generating a read address and a write address to be applied to said image memory; and
an address bus for applying the address generated by said address counter to said image memory;
wherein said processing circuit is structured such that a delay of n (n is a positive integer) transfer clocks or an integer multiple of n clocks is generated between the input and output data;
said address counter comprises
a read address counter which is counted up at a period of n transfer clocks, and
a delay circuit array having a plurality of delay circuits, cascade connected for generating a plurality of write addresses from a read address counted by read address counter, and
said image memory comprises a write address selecting circuit which selects, when a delay time of a write data processed by said processing circuit is Kxn transfer clocks (K is a positive integer), a write address outputted from said delay circuits,
said write address provided by shifting the read address by an amount corresponding to Kxn transfer clocks,
whereby the delay time of the whole processing circuit becomes the integer multiple of n transfer clocks regardless of the combination of the plurality of processing circuits and that the processing circuits can be freely coupled with each other.

6. A digital image processing apparatus according to claim 5 in which said plurality of delay circuits are cascade connected, and each generating a delay of n transfer clocks,
and said write address selecting circuit selects a write address outputted from Kth delay circuit.

7. A digital image processing apparatus according to claim 5 in which said processing circuit has a plurality of image processing elements, and is capable of pipeline processing image data.

* * * * *